United States Patent
Fang et al.

(10) Patent No.: US 9,950,336 B2
(45) Date of Patent: Apr. 24, 2018

(54) COATING APPARATUS AND PROCESS FOR MANUFACTURING COLOR FILTER SUBSTRATE

(71) Applicants: BOE TECHNOLOGY GROUP CO., LTD., Beijing (CN); BEIJING BOE DISPLAY TECHNOLOGY CO., LTD., Beijing (CN)

(72) Inventors: Qun Fang, Beijing (CN); Hongjiang Wu, Beijing (CN); Dong Wang, Beijing (CN); Changjun Zha, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 547 days.

(21) Appl. No.: 14/355,456

(22) PCT Filed: Nov. 14, 2013

(86) PCT No.: PCT/CN2013/087144
§ 371 (c)(1),
(2) Date: Apr. 30, 2014

(87) PCT Pub. No.: WO2014/190680
PCT Pub. Date: Dec. 4, 2014

(65) Prior Publication Data
US 2015/0174602 A1    Jun. 25, 2015

(30) Foreign Application Priority Data
May 31, 2013    (CN) .......................... 2013 1 0215361

(51) Int. Cl.
*B05C 1/10*    (2006.01)
*B05D 1/28*    (2006.01)
(Continued)

(52) U.S. Cl.
CPC .................. *B05C 1/10* (2013.01); *B05C 1/00* (2013.01); *B05C 1/0808* (2013.01); *B05D 1/28* (2013.01);
(Continued)

(58) Field of Classification Search
CPC ........... B05C 1/10; B05C 1/28; B05C 1/0808; B05C 1/00; B05C 13/00; B41F 31/26;
(Continued)

(56) References Cited

U.S. PATENT DOCUMENTS 4,911,948 A * 3/1990 McIntyre ................ B41F 15/12
427/208.2
4,976,817 A * 12/1990 Correa .................... B30B 3/005
118/115
(Continued)

FOREIGN PATENT DOCUMENTS

CN    86103204 A    9/1987
CN    2073327 A    3/1991
(Continued)

OTHER PUBLICATIONS

Second Chinese Office Action dated Nov. 30, 2015; Appln. No. 201310215361.3.
(Continued)

*Primary Examiner* — Laura Edwards
(74) *Attorney, Agent, or Firm* — Ladas & Parry LLP

(57) ABSTRACT

A coating apparatus for manufacturing a color filter substrate, comprising a roller and a resin-pressing device, the roller is provided with a plurality of openings on its external surface, the openings have a shape identical to a shape of color pixel units of the substrate to be coated, the roller is further provided with a cavity communicating with the openings, the cavity is configured for housing resin; the resin-pressing device is configured for forcing the resin
(Continued)

within the cavity out through the openings. Also disclosed is a process for manufacturing a color filter substrate, comprising: providing a substrate, on which a predetermined area forming patterns for color filter units is provided; and coating the predetermined area of the substrate with the coating apparatus to form the patterns for color filter units.

13 Claims, 4 Drawing Sheets

(51) Int. Cl.
G02B 5/20 (2006.01)
B05C 1/00 (2006.01)
B05C 1/08 (2006.01)
B05D 5/06 (2006.01)
B05C 13/00 (2006.01)

(52) U.S. Cl.
CPC .............. B05D 5/065 (2013.01); G02B 5/20 (2013.01); B05C 13/00 (2013.01)

(58) Field of Classification Search
CPC ........ B41F 31/04; B41P 2231/10; B05D 1/28; B05D 5/065; G02B 5/20
USPC ................ 118/211, 212, 244, 259, 266; 101/114–129; 165/89, 90; 427/428.01, 427/162
See application file for complete search history.

(56) References Cited

U.S. PATENT DOCUMENTS

| | | | | |
|---|---|---|---|---|
| 5,007,445 A | * | 4/1991 | Pender | ............... B65G 49/0413 118/404 |
| 5,533,447 A | * | 7/1996 | Johnson | .................. B41F 17/00 101/151 |
| 6,234,078 B1 | * | 5/2001 | Kessler | ................... B41F 31/22 101/329 |
| 6,647,883 B1 | * | 11/2003 | McNeil | .................... B41M 1/00 101/114 |
| 7,963,757 B2 | * | 6/2011 | Lee | ........................ H05B 33/10 101/214 |
| 2008/0134913 A1 | * | 6/2008 | Sato | ........................ B41L 23/20 101/118 |
| 2010/0126366 A1 | * | 5/2010 | Kasper | .................... B41F 7/265 101/350.2 |
| 2012/0301615 A1 | * | 11/2012 | Honda | .................. C23C 14/541 427/255.5 |

FOREIGN PATENT DOCUMENTS

| | | |
|---|---|---|
| CN | 102566134 A | 7/2012 |
| CN | 102707358 A | 10/2012 |
| CN | 103286032 A | 9/2013 |
| EP | 0235425 A1 | 9/1987 |
| JP | 2006-337952 A | 12/2006 |
| JP | 4226946 B2 | 2/2009 |
| WO | WO2011/093073 * | 8/2011 |

OTHER PUBLICATIONS

International Preliminary Report on Patentability dated Dec. 1, 2015; PCT/CN2013/087144.
First Chinese Office Action dated Mar. 23, 2015; Appln. No. 201310215361.3.
International Search Report for International Application No. PCT/CN2013/087144 dated Feb. 10, 2014, 13pgs.

* cited by examiner

COATING APPARATUS AND PROCESS FOR MANUFACTURING COLOR FILTER SUBSTRATE

CROSS REFERENCE TO RELATED APPLICATIONS

This application is based on International Application No.PCT/CN2013/087144 filed on Nov. 14, 2013, which claims priority to Chinese National Application No. 201310215361.3 filed on May 31, 2013. The entire contents of each and every foregoing application are incorporated herein by reference.

TECHNICAL FIELD

Embodiments of the present invention relates to a coating apparatus as well as a process for manufacturing a color filter substrate using the same.

BACKGROUND

A display panel is formed by an array substrate and a color filter substrate through cell-assembly, and liquid crystal is filled between the array substrate and the color filter substrate. The color filter substrate is provided with a black matrix thereon, and the opening areas of the black matrix is provided with color filter units, each of the color filter units may be constituted by three color pixel units, i.e., red (R), blue (B), green (B) sub-pixel units, respectively.

At present, the process for making a color filter unit is conducted as follows. A red light-filter resin layer is coated on the substrate, and after being pre-cured, a portion of the red light-filter resin layer to be left on the substrate is subjected to exposure with an exposure machine and a mask plate, and then a developing machine is used to develop the unexposed part of the red light-filter layer so as to remove this part, then a cure process is performed such that red pixel units can be formed within a predetermined area of the substrate. The above processes are repeated, so that the predetermined areas on the substrate are formed with blue pixel units and green pixel units therein. The above-mentioned color light-filter resin may employ a material having photosensitivity, and in this case, no additional photoresist is needed for patterning; a material having no photosensitivity may also be used for the color light-filter resin; however, in this case, additional photoresist is needed for the patterning.

As can be seen from the above, successive exposure, development, and the like are required during the above process for forming color filters, thus on one hand, the process is relatively complicated and thus the manufacture duration is longer; on the other hand, consumption of the light-filter resin is higher, energy consumption of the apparatus is also higher, and the mask plate has a higher price (about RMB 800,000/sheet), so that the entire costs for manufacture is higher.

SUMMARY

Embodiments of the present invention provides a coating apparatus and a process for manufacturing a color filter substrate using the same, which can form a color filter on the substrate directly without exposure, development processes, thus saving time and costs of manufacture.

An embodiment of the present invention provides a coating apparatus for manufacturing a color filter substrate, comprising a roller and a resin-pressing device, wherein the roller is provided with a plurality of openings on its external surface, the openings have a shape identical to a shape of color pixel units of the substrate to be coated, the roller is further provided with a cavity communicating with the openings, the cavity is configured for housing resin, and the resin-pressing device is configured for forcing the resin within the cavity out through the openings.

For example, the coating apparatus may further comprise a base, the roller is supported on the base, a support platform for placement of the substrate is provided between the base and the roller, and the support platform is away from the roller by a distance identical or equivalent to a thickness of the substrate.

For example, in the coating apparatus, the support platform is connected with a movement regulating device configured for moving the support platform, and the moving direction of the support platform is perpendicular to an axial direction of the roller.

For example, the coating apparatus may further comprise a heating device configured for heating the support platform or the substrate.

For example, the resin-pressing device may comprise a resin-transfer mechanism and a gas-feeding mechanism, the resin-feeding mechanism is configured for feeding the resin into the cavity and adhering the resin at the openings; and the gas-feeding mechanism is used for feeding gas into the cavity and forcing out the resin adhered at the openings.

For example, the resin-feeding mechanism may comprise a resin-feeding pipe and a resin-feeding pump, and one end of the resin-feeding pipe is connected with the resin-feeding pump and the other end extends into the cavity of the roller.

For example, the resin-feeding pipe extends into and through the cavity, and the resin-feeding pipe extending therein is provided with resin-feeding ports opposite to the openings.

For example, the shape of the resin-feeding port is identical to that of the opening.

For example, the resin-feeding mechanism may comprise a gas-feeding pipe and a gas-feeding pump, and one end of the gas-feeding pipe is connected with the gas-feeding pump and the other end extends into the cavity of the roller.

For example, the gas-feeding pipe extends into and through the cavity, and the gas-feeding pipe extending therein is provided with gas outlets opposite to the openings.

For example, the roller is provided with a plurality of rings of the openings distributed evenly in the axial direction, and each ring of the openings is composed of the openings distributed separately along the circumferential direction.

For example, a barrier is provided between two adjacent rings of openings in the axial direction on an external surface and/or inner surface of the roller.

For example, the barrier protrudes by a height slightly over the surface of the roller.

An embodiment of the present invention also provides a process for manufacturing a color filter substrate, comprising: providing a substrate, on which predetermined areas for forming patterns of color filter units are provided; forming the patterns of color filter units by coating within the predetermined area of the substrate using any one of the above coating apparatuses.

For example, the predetermined areas comprise a first predetermined area, a second predetermined area as well as a third predetermined area, the roller of the coating apparatus is pressed against the surface of the substrate, and when a relative movement occurs between the roller and the substrate, the resin-pressing device of the coating apparatus coats the first predetermined area of the substrate with light-filter resin of a first color, and then performing a cure process so as to form the patterns for pixel units of the first color; next, repeating above steps, forming the patterns for pixel units of a second color in the second predetermined area of the substrate, and forming the pattern for pixel units of a third color in the third predetermined area.

For example, the method may further comprises, after coating the predetermined areas of the substrate to form the patterns for color filter units: forming a black matrix on the substrate formed with the patterns for color filter units, and the black matrix is located between the patterns for color pixel units.

BRIEF DESCRIPTION OF THE DRAWINGS

In the following, a brief introduction of the drawings of the embodiment of the present invention will be given so as to describe the technical solutions of the embodiments more clearly, and it's obvious that the drawings described hereinafter just concern some embodiments of the present invention, rather than limitation to the present invention.

REFERENCE NUMERALS

1: roller, 10: opening, 11: first through hole, 12: second through hole, 2: support platform, 3: substrate, 4: resin-feeding pipe, 40: resin-feeding port, 5: gas-feeding pipe, 50: gas outlet, 6: barrier

DETAILED DESCRIPTION

To make clearer the object, technical solutions and advantages of the embodiments of the present invention, a clear and full description of the technical solution of the embodiment of the present invention will be made with reference to the accompanying drawings of the embodiment of the present invention. Obviously, the described embodiments are merely part of the embodiments of the present invention, but not all the embodiments. Based on the described embodiments of the present invention, all the other embodiments acquired by the ordinary skilled in this art, without any creative labor, fall into the protective scope of the present invention.

Figure 1:
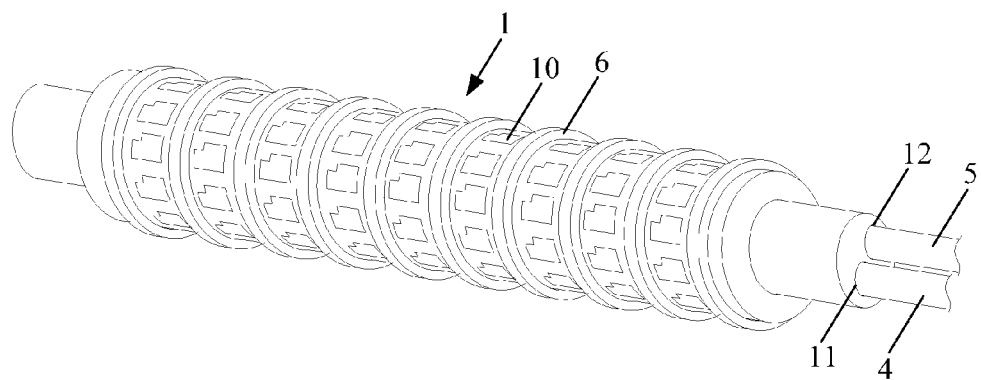
FIG. 1 is a schematic view of the coating apparatus provided by an embodiment of the present invention.

With reference to FIG. 1, the embodiment of the present invention provides a coating apparatus capable of making a color filter substrate comprising a roller and a resin-pressing device. The roller 1 is provided with a plurality of openings 10 along its external surface, the openings 10 have a shape identical to the shape of the color pixel units of the substrate to be coated, the roller 1 is also provided with a cavity (not shown in the drawing) communicating with the openings 10, and the cavity is used for housing the resin; the resin-pressing device is configured for forcing the resin within the cavity out through the openings 10.

When the roller 1 is rolling on the substrate, the resin forced out through the openings 10 forms a pattern having a shape identical to that of the openings 10, that is, forming a pattern of the color pixel units; in this way, the pattern of the color filter units can be directly formed on the substrate without exposure and development processes, thus saving time and costs of manufacture.

It should be further noted that this embodiment eliminates the processes of exposure and development. First, the method avoids using a mask plate that is used in an exposure process, and as mentioned in the background portion, the costs for making a mask plate are higher, so that the present invention reduces the costs of manufacture to a greater extent; second, in an exposure process in the conventional technology, color photoresist having photosensitivity is coated onto the entire substrate at first, then most (over ⅔) of the color photoresist is removed during the development process. However, in the present embodiment, the color light-filter resin is coated only within predetermined areas, so that a large amount of color light-filter resin can be saved, and a developer solution also become unnecessary. In addition, the present embodiment can reduce the usage frequency of the exposure machine, the developing machine and the like associated apparatus, thus a large amount of energy consumption can be reduced and the lifespan of the apparatuses can be elongated; furthermore, reduction in the amount of processes can improve the yield of products, and facilitate the control and improvement on quality.

In order to provide a better understanding of the embodiment of the present invention for those skilled in this art, a detailed description is presented about the coating apparatus capable of implementing the process of coating color filters directly on the substrate in connection with FIGS. 1-5. It should be understood that, in some situation, the coating apparatus of the embodiment of the present invention may also be applied to the structural pattern other than color filter units.

Figure 2:
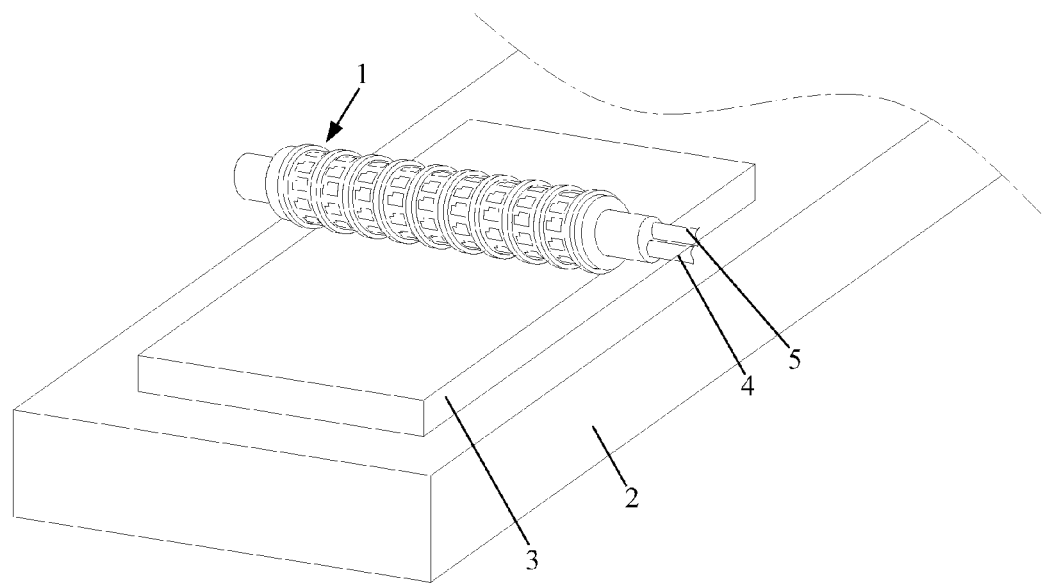
FIG. 2 is a schematic view of the coating apparatus, in coating a substrate, provided by the embodiment of the present invention.
Figure 8:
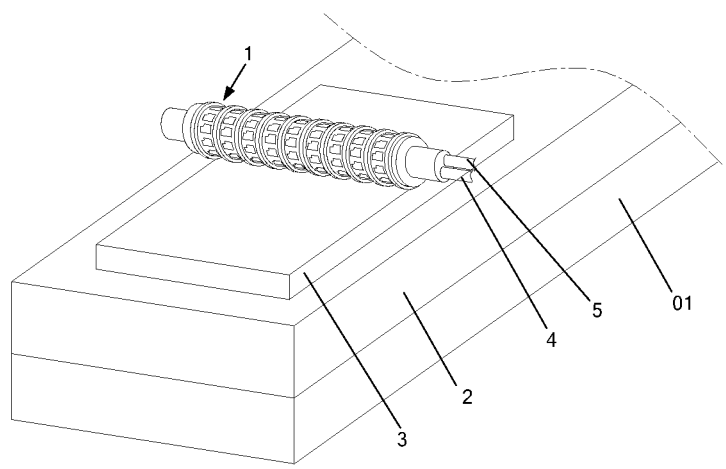
FIG. 8 is a schematic view of the coating apparatus, in coating a substrate, provided by an embodiment of the present invention.

As shown in FIGS. 1 and 2, the embodiment of the present invention provides a coating apparatus comprising a roller 1 provided with a cavity, a resin-pressing device, a base 01 (as shown in FIG. 8), the outer surface of the roller 1 is provided with a plurality of openings 10, and the openings 10 has a shape identical to that of the color pixel units of the substrate to be coated. The roller is further provided with a cavity communicating with the openings, the cavity is used for housing the resin to be coated, and the resin-pressing device is configured for forcing the resin within the cavity out through the openings. The roller 1 is supported on the base, and a support platform is provided between the base and the roller 1 for the placement of the substrate 3. The support platform 2 is away from the roller 1 by a distance identical or equivalent to the thickness of the substrate 3, such that the roller 1 can approach or is completely pressed against the surface of the substrate 3 so that the resin extruded by the resin-pressing device is directly coated onto the substrate 3; further the following problem can be avoided that: a complete pattern for the color pixel units can not be formed because the distance is so great that the extruded photoresist deviates from the predetermined areas.

It should be noted that, during coating, the alignment of the substrate 3 may be conducted so that the length direction thereof is parallel to the axial direction of the roller 1, and in this case the length of the substrate is approximately same as the axial length of the roller 1, or the width direction of the substrate 3 is parallel to the axial direction of the roller 1, and in this case the width of the substrate 3 is approximately same as the axial length of the roller 1. In the embodiment of the present invention, the latter is used as the optional solution to be described.

Figure 9:
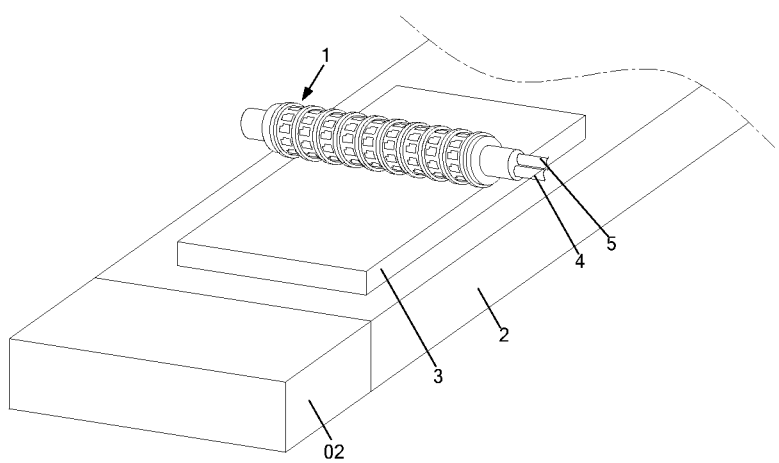
FIG. 9 is a schematic view of the coating apparatus, in coating a substrate, provided by an embodiment of the present invention.

When the coating apparatus is used to coat, all of the predetermined areas on the substrate 3 can be completely coated only if a relative movement occurs between the roller 1 and the support platform 2. For realizing the relative movement, the roller 1 may be implemented as a mechanism that is moveable, and the moving direction thereof is perpendicular to its axial direction; or, the support platform 2 may be implemented as a mechanism that is movable, that is, the support platform 2 is connected with a movement regulating device 02 (as shown in FIG. 9) for moving the support platform 2, and the moving direction of the support platform 2 is perpendicular to the axial direction of the roller 1. The latter example is applied as a preferred example in the embodiment of the present invention, and the movable support platform of this preferred example also facilitate the pipeline production of substrates. Moreover, in the embodiment of the present invention, the patterns of color filter units are coated onto the predetermined areas of the substrate 3 directly through the roller 1, and the color filter units are regularly arranged on the substrate 3, thus the substrate 3 on the support platform 2 is required to be aligned with the roller 1 accurately. In this way, the above movement regulating device may further have an alignment regulating function for the alignment regulation for the support platform 2.

The color light-filter resin coated onto the substrate 3 needs to be heat to cure, so as to from the steady patterns for the color filter units, and therefore the coating apparatus provided by the embodiment of the present invention may further comprise a heating device (not shown in the drawing). The heating device is used for heating the support platform 2 to further heat the substrate 3 arranged thereon to a certain temperature so that thermosetting of the color light-filter resin remained on the substrate 3 can be conducted; or, the substrate 3 is heated to a certain temperature not by heating the support platform 2, but the heating device heats the substrate 3 directly to make it reach a certain temperature, and then thermosetting of the color light-filter resin remained on the substrate 3 can be realized.

Regarding the resin-pressing device of the above coating apparatus, one example thereof may comprise a resin-transfer mechanism and a gas-feeding mechanism. The resin-feeding mechanism is used for feeding the resin into the cavity and adhering the resin at the openings 10; the gas-feeding mechanism is used for feeding gas into the cavity and pushing out the resin adhered at the openings 10 from the openings 10, and the thickness of the pattern coated onto the substrate 3 can be controlled by regulating the volume of the extruded resin by controlling the gas pressure of the gas-feeding mechanism.

As an optional example, with reference to FIGS. 1 and 2, one example of the above-described resin-transfer mechanism comprises a resin-feeding pipe 4 and a resin-feeding pump (not shown in the drawing), one end of the resin-feeding pipe 4 is connected with the resin-feeding pump and the other end extends into the cavity of the roller 1. In this way, it's possible to draw the color light-filter resin into the resin-feeding pipe 4 with the resin-feeding pump, and into the cavity from the end of the resin-feeding pipe 4 extending into the cavity.

Figure 4:
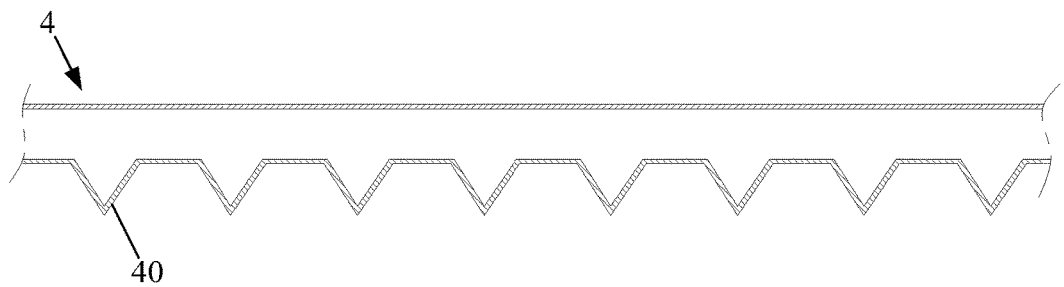
FIG. 4 is a schematic section view of the resin-feeding pipe in the coating apparatus provided by the embodiment of the present invention.

Nevertheless, when the resin-feeding pipe 4 extends into and through the cavity, and the resin-feeding pipe 4 extending therein is provided with resin-feeding ports 40 opposite to the openings 10 (as shown in FIG. 4), the resin inside of the resin-feeding pipe 4 can outflow directly from the resin-feeding ports 40 and adhere at the openings 10. In this way, it can be guaranteed that color light-filter resin adheres to each of the openings 10 to avoid such omission that the substrate lacks the patterns for part of the color pixel units.

The aforesaid resin-feeding ports 40 have a shape identical to that of the openings 10, thus it can be guaranteed that the color light-filter resin extruded from the resin-feeding ports 40 is completely adhered to the openings 10.

Also as an optional example, with reference to FIGS. 1 and 2, one example of aforesaid gas-feeding mechanism comprises a gas-feeding pipe 5 and a gas-feeding pump (not shown in the drawing), one end of the gas-feeding pipe 5 is connected with the gas-feeding pump and the other end extends into the cavity of the roller 1; in this way, gas can be drawn into the gas-feeding pipe 5 through the gas-feeding pump and into the cavity through the end of the gas-feeding pipe 5 extending into the cavity.

Figure 5:
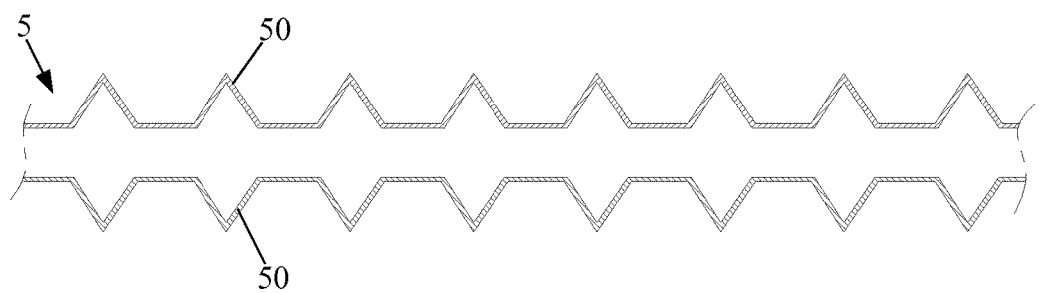
FIG. 5 is a schematic section view of the gas-feeding pipe in the coating apparatus provided by the embodiment of the present invention.

Similar to the structure of the above resin-feeding pipe 4, the gas-feeding pipe 5 extends into and through the cavity, and the gas-feeding pipe extending therein is provided with gas outlets 50 opposite to the openings 10 (as shown in FIG. 5); the gas inside of the gas-feeding pipe 5 can be blown toward the openings 10 directly from the gas outlets 50. It can be understood that, in this way, the gas pressure at each of the gas outlets is nearly or completely the same, thus the extruded volume of color light-filter resin there is nearly or completely identical and thus the thickness of the pattern for the color pixel units formed on the substrate is nearly or completely identical.

It can be appreciated herein that, in order that the gas within the cavity can accumulate to produce a larger air pressure so as to push out the color light-filter resin within the cavity, the cavity is a sealed cavity body during coating; with reference to FIG. 1, one end of the cavity is sealed and the other end is provided with a first through-hole 11 matching with the resin-feeding pipe 4 and a second through-hole 12 matching with the gas-feeding pipe 5. Accordingly, when the resin-feeding pipe 4 and the gas-feeding pipe 5 are inserted through the first through-hole 11 and the second through-hole 12 respectively, the interior of the roller 1 is implemented as a sealed configuration. The two ends of the cavity comprising the first through-hole 11 and the second through-hole 12 each may be of a cover configuration, the cover on one end thereof is provided with the first through-hole 11 and the second through-hole 12. Such a cover configuration may be removable to facilitate cleaning, maintenance and the like for the interior of the roller 1.

Naturally, the above resin-pressing device may not include a gas-feeding mechanism, and in this case the resin-feeding pump is provided to have a pumping force, which is large enough to force out the color light-filter resin from the openings 10 of the roller 1 when the roller 1 performs the coating process, and the extruded color light-filter resin is applied onto the substrate 3 so that a pattern is formed on the substrate 3.

Figure 3:
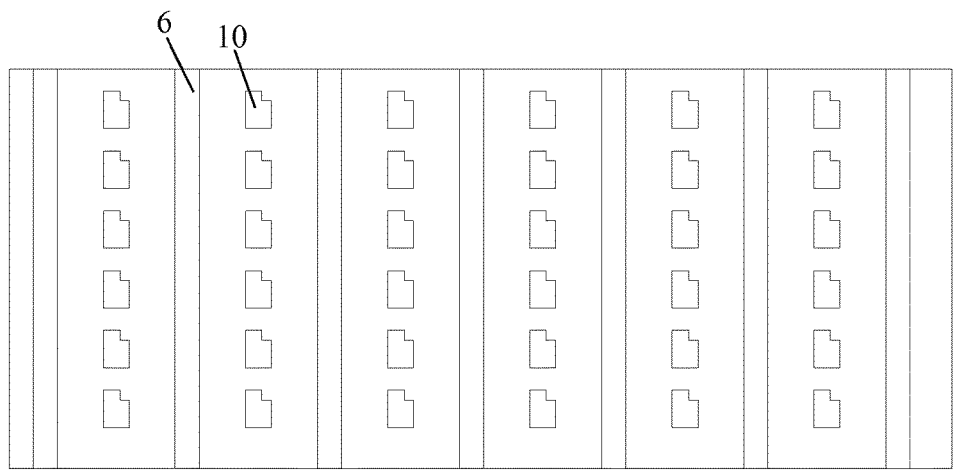
FIG. 3 is an expanding schematic plan view of the roller in the coating apparatus provided by the embodiment of the present invention.

The patterns for the color filter units formed on the substrate are generally in a matrix pattern. Each of the color filter units comprises three color pixel units, which may be, for example, red, green, blue sub-pixel units respectively. Therefore it can also be understood that a plurality of rows of color pixel units are arranged in parallel on the substrate, every two adjacent rows of color pixel units of the same color interpose two kinds of color pixel units of different colors. In order that the roller 1 can form the above patterns during coating, rings of openings that are evenly distributed along the axial direction may be provided on the roller 1, as illustrated in FIG. 3, for example. FIG. 3 is an expansion plan view of the roller 1 that is taken by cutting open along the axial direction, and in the illustrative view, the width is the circumference length of the roller 1, and the length is the axial length of the roller 1, and each ring of the openings is composed of openings 10 distributed separately along the circumferential direction, and the openings 10 in each ring are arranged in the axial direction so as to form rows of openings. As shown in the arrangement of FIG. 3, every three rings of openings correspond to color pixel units of red, green, and blue, respectively.

It should be noted that the color filter units formed on the substrate are not limited to a regular matrix pattern. For example, the color filter on the substrate may be formed of a plurality of rows of color pixel units arranged side by side, while color pixel units in each row are arranged in a stagger form in the column direction, which is generally referred to as "mosaic" arrangement. In such a situation, the roller 1 of the coating apparatus is provided with a plurality of rings of openings distributed evenly in the axial direction, and each ring of openings comprise the openings 10 distributed separately along the circumferential direction, and the openings 10 in each ring are arranged in a stagger form in the axial direction.

Additionally, the color filter units may comprise at least three kinds of color pixel units, for example, in addition to the above-mentioned red, green, blue sub-pixel units, and they may further comprise yellow and/or claret-red and/or transparent sub-pixel units and the like as desired. Absolutely, the aforementioned scheme of three colors, i.e., red, green, blue colors, is one preferred example but not exclusive, other color scheme is also available so as to achieve some desired display function.

Because two adjacent rings in the axial direction correspond to color light-filter resins of different colors, a barrier 6, as shown in FIG. 1 or 3, is provided between the two adjacent rings on the external and/or internal surface of the roller, thus it's possible to prevent the color light-filter resin adhered to one ring of openings 10 from flowing to the adjacent one ring of openings 10 and thus cause blend of the color light-filter resins of different colors. It's preferable herein to arrange barriers 6 on both the external surface and/or the internal surface of the roller 1.

When the height of the barrier 6 is relatively great, a certain distance occurs between the external surface of the roller 1 and the surface of the support platform 2, thus the roller 1 may not press against the substrate 3 when the roller 1 performs the process of coating, and in this case the extruded color light-filter resin may be caused to deviate from the predetermined area, and as a result, complete patterns for the color pixel units cannot be obtained; accordingly, to avoid such an effect, the height of the barrier 6 may be slightly over the external surface and/or the internal surface of the roller 1 (the preferred height is less than 10 μm).

Generally speaking, the coating apparatus provided by the embodiment of the present invention may be of any form of the combination of the aforesaid examples, but not limited to an embodiment of the form of a specific combination, and for a clearer understanding of the present invention for readers, a detailed description of the form of a preferred combination thereof is made in the following.

With reference to FIGS. 1 and 2 again, the coating apparatus comprises a roller 1 provided with a cavity, a resin-pressing device, a base supporting the roller 1 thereon as well as a heating device for thermosetting, rings of openings 10 are evenly axially distributed on the roller 1, and barriers 6 are provided on the external surface and the internal surface of the roller between two adjacent rings of openings 10. The openings 10 have a shape the same as that of the color pixel units (comprising red, green, blue pixel units). One end of the cavity is closed and the other end is provided with a through-hole 11 and a second through-hole 12, the resin-feeding pipe 4 and the gas-feeding pipe 5 extend into and through the entire cavity through the first through-hole 11 and the second through-hole respectively, the resin-feeding pipe 4 is provided with resin-feeding ports 40 thereon opposite to the openings 10, and the shape of the resin-feeding ports 40 is the same as that of the openings 10, the gas-feeding pipe 5 is provided with gas outlets 50 opposite to the openings 10s. Between the base and the roller 1, there is provided with a movable support platform 2 for placement of the substrate 3, the support platform 2 is away from the roller 1 by a distance identical or equivalent to the thickness of the substrate 3, and the moving direction of the support platform 2 is perpendicular to the axial direction of the roller 1.

When the substrate 3 is placed upon the support platform 2, the width direction of the substrate 3 is parallel to the axial direction of the roller; the regulating device works to align the substrate 3 with the roller 1, the roller 1 is pressed against the substrate 3, and then the regulating device works to move the substrate 3 and at the same time the roller 1 is rotated also, and in this way the coating process is carried out.

Figure 6:
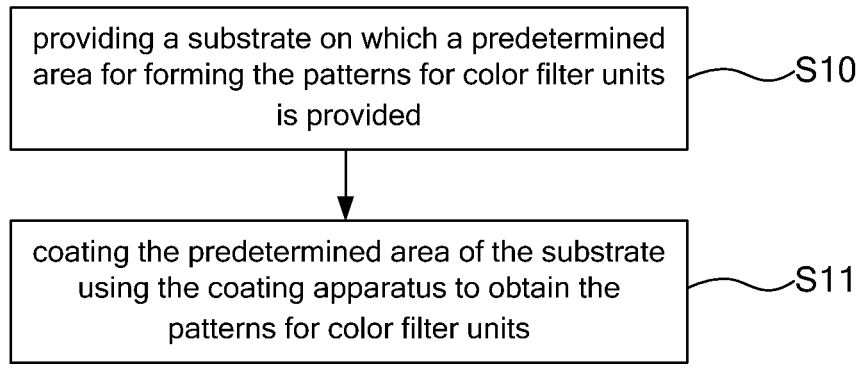
FIG. 6 is a schematic view illustrating the flow chart of the process for manufacturing a color filter substrate provided by an embodiment of the present invention.

Based on the above coating apparatus, an embodiment of the present invention also provides a process for producing a color filter substrate, as shown in FIG. 6, and the process comprises the following steps.

S10: providing a substrate on which a predetermined area for forming the patterns for color filter units is provided.

S11: coating the predetermined area of the substrate using the coating apparatus to obtain the patterns for color filter units.

Because the process for manufacturing a color filter substrate employs the above coating apparatus, it's possible to form a color filter directly on the substrate without the exposure, development processes, thus saving the time and costs of manufacture.

It should be further noted, the present embodiment eliminates the processes of exposure and development. Firstly, such a process avoids using a mask plate that is used in a exposure process, and as stated in the background portion, the costs for making a mask plate are high, so that the present invention reduces costs of manufacture to a greater extent; and secondly, in the present process, the color light-filter resin is coated only within a predetermined area and therefore a large quantity of color light-filter resin is saved and at the same time, the developer solution also become unnecessary; and further, the present process can reduce the using frequency of an exposure machine, a developing machine and the like associated apparatus, so that it's possible to reduce large quantities of energy consumption and also improve lifespan of the apparatuses; finally, reduction in the amount of processes can improve the yield of products, and facilitate the control and improvement on quality.

Figure 7:
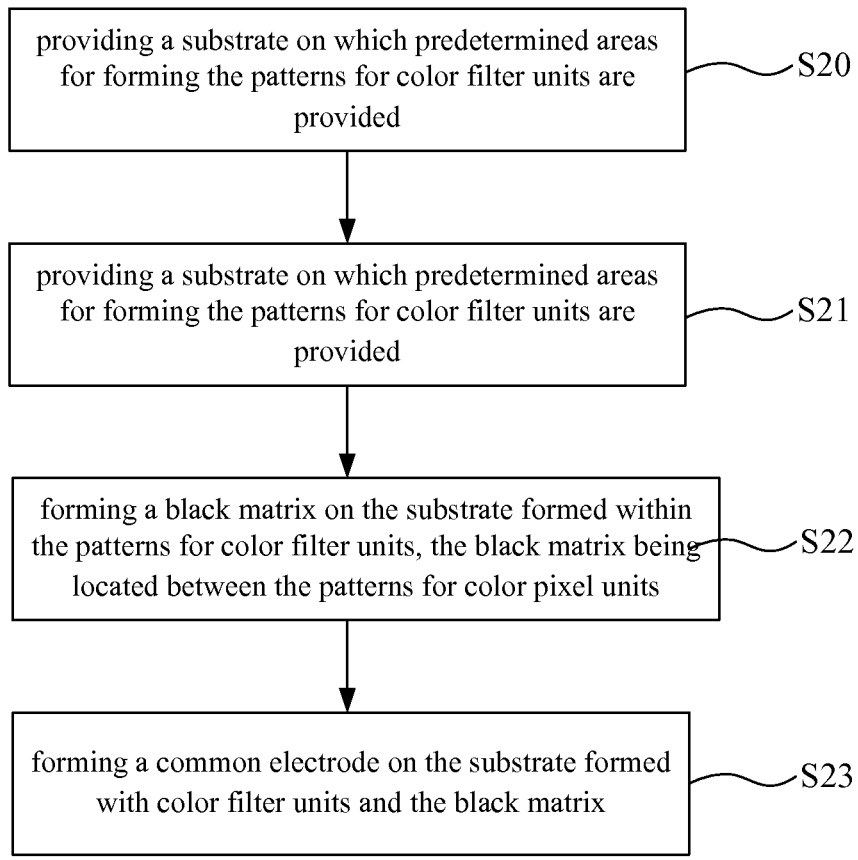
FIG. 7 is a schematic view illustrating the detailed flow chart of the process for manufacturing a color filter substrate provided by an embodiment of the present invention.

Hereinafter, the process for manufacturing a color filter substrate provided by an embodiment of the present invention will be further introduced with reference to FIG. 7.

S20: providing a substrate on which predetermined areas for forming the patterns for color filter units are provided, the predetermined areas comprising a first predetermined area, a second predetermined area, and a third predetermined area;

S21: coating the predetermined areas of the substrate using the coating apparatus to obtain the patterns for color filter units.

S22: forming a black matrix on the substrate formed within the patterns for color filter units, the black matrix being located between the patterns for color pixel units.

As to a twisted nematic or vertical alignment type display panel, the process for manufacturing a color filter substrate can also further comprises the following steps.

S23: forming a common electrode on the substrate formed with color filter units and the black matrix.

One example of the step S21 comprises the following steps:

S210: aligning the substrate placed on the support platform with the roller, pressing the roller against the surface of the substrate, and where a relative movement occurs between the roller and the substrate, the resin-pressing device coating the first predetermined area of the substrate with light-filter resin of a first color, and then performing a thermosetting process with the heating device so as to form the patterns for pixel units of the first color;

S220: repeating above steps, forming the patterns for the pixel units of a second color in the second predetermined area of the substrate, and forming the patterns for the pixel units of a third color in the third predetermined area, so that all the color filter units are formed;

Here it should be noted the first color recited in step S210, the second and third colors recited in step S220 may be red, green, and blue colors respectively, however, the three colors, i.e., red, green, blue colors recited here and above belong to one preferred scheme but not exclusive, other colors may also be available, and even a fourth color, a fifth color and so on may be further comprised so as to achieve some desired display functions. Additionally, as to the sequence for manufacturing the patterns for pixel units of different colors, it's possible to select a corresponding sequence as required, no restriction is made herein.

Since the coating apparatus employed in the above method has been described in detail in the above description, the redundant description thereof is omitted here; and the processes for making a black matrix, the common electrode, etc., may all use currently well-established processes, the redundant description thereof is omitted here. It should be further understood the skilled person in this art can realize the function by the aforesaid process for manufacturing a color filter substrate by any one of the aforementioned coating apparatuses.

The above embodiments are only exemplary embodiments of the present invention, rather than limiting the protective scope of the present invention, the protective scope of the present invention is defined by the accompanying claims.

The invention claimed is:

1. A coating apparatus for manufacturing a color filter substrate, comprising a roller and a resin-pressing device,
wherein the roller is provided with a plurality of openings on its external surface, the openings have a shape identical to a shape of color pixel units of a substrate to be coated, the roller is further provided with a cavity communicating with the openings, and
the resin-pressing device comprises:
a resin-feeding mechanism configured for feeding a resin into the cavity and adhering the resin at the openings, the cavity is configured for housing the resin, and
a gas-feeding mechanism configured for feeding gas into the cavity and forcing out the resin adhered at the openings, and
the resin-pressing device is configured for forcing the resin within the cavity out through the openings to the substrate to be coated, and
the gas-feeding mechanism comprises a gas-feeding pipe, the gas-feeding pipe extends into and through the cavity, and a portion of the gas-feeding pipe within the cavity is provided with gas outlets opposite to the openings;
the plurality of openings arranged in rings, the rings are distributed evenly in an axial direction of the roller, and the openings in each of the rings are distributed separately along a circumferential direction of the roller, a first barrier is provided between two adjacent rings of openings in the axial direction on an inner surface of the roller to prevent the resin adhered to one of the rings of the openings from flowing to adjacent one of the rings of the openings to avoid blending of resins of different colors.

2. The coating apparatus according to claim 1, further comprising a base, wherein the roller is supported on the base, a support platform for placement of the substrate is provided between the base and the roller, and the support platform is away from the roller by a distance identical or equivalent to a thickness of the substrate.

3. The coating apparatus according to claim 2, wherein the support platform is connected with a movement regulating device configured for moving the support platform, and a moving direction of the support platform is perpendicular to an axial direction of the roller.

4. The coating apparatus according to claim 2, further comprising a heating device configured for heating the support platform or the substrate.

5. The coating apparatus according to claim 1, wherein the resin-feeding mechanism comprises a resin-feeding pipe and a resin-feeding pump, and one end of the resin-feeding pipe is connected with the resin-feeding pump and the other end extends into the cavity of the roller.

6. The coating apparatus according to claim 5, wherein the resin-feeding pipe extends into and through the cavity, and the resin-feeding pipe that is extended therein is provided with resin-feeding ports opposite to the openings.

7. The coating apparatus according to claim 6, wherein a shape of the resin-feeding ports is identical to that of the openings.

8. The coating apparatus according to claim 1, wherein the gas-feeding mechanism further comprises a gas-feeding pump, and one end of the gas-feeding pipe is connected with the gas-feeding pump and the other end extends into the cavity of the roller.

9. A coating apparatus for manufacturing a color filter substrate, comprising a roller and a resin-pressing device,
wherein the roller is provided with a plurality of openings on its external surface, the openings have a shape identical to a shape of color pixel units of a substrate to be coated, the roller is further provided with a cavity communicating with the openings, and
the resin-pressing device comprises:
a resin-feeding mechanism configured for feeding a resin into the cavity and adhering the resin at the openings, the cavity is configured for housing the resin, and
a gas-feeding mechanism configured for feeding gas into the cavity and forcing out the resin adhered at the openings, and
the resin-pressing device is configured for forcing the resin within the cavity out through the openings to the substrate to be coated, and
the gas-feeding mechanism comprises a gas-feeding pipe, the gas-feeding pipe extends into and through the cavity, and a portion of the gas-feeding pipe within the cavity is provided with gas outlets opposite to the openings;
the plurality of openings arranged in rings, the rings are distributed evenly in an axial direction of the roller, and the openings in each of the rings are distributed separately along a circumferential direction of the roller, a first barrier is provided between two adjacent rings of openings in the axial direction on an inner surface of the roller to prevent the resin adhered to one of the rings of the openings from flowing to adjacent one of the rings of the openings to avoid blending of resins of different colors;
wherein a second barrier is provided between two adjacent rings of openings in the axial direction on an external surface of the roller to prevent the resin adhered to one of the rings of the openings from flowing to adjacent one of the rings of the openings to avoid blending of resins of different colors.

10. The coating apparatus according to claim 9, wherein the second barrier protrudes by a height slightly over the surface of the roller.

11. A process for manufacturing a color filter substrate comprising a step of providing the apparatus of claim 9, the process comprising:
providing a substrate on a platform,
applying resin on the substrate with the roller, and forming patterns of color filter units within predetermined areas.

12. The process for manufacturing a color filter substrate according to claim 11, wherein the predetermined areas comprise a first predetermined area, a second predetermined area as well as a third predetermined area,
the roller of the coating apparatus is pressed against the surface of the substrate, and when a relative movement occurs between the roller and the substrate, the resin-pressing device of the coating apparatus coats the first predetermined area of the substrate with light-filter resin of a first color, and then performing a cure process so as to form the patterns for pixel units of the first color; next, repeating above steps, forming the patterns for pixel units of a second color in the second predetermined area of the substrate, and forming the pattern for pixel units of a third color in the third predetermined area.

13. The process for manufacturing a color filter substrate according to claim 11, further comprising, after coating the predetermined areas of the substrate to form the patterns for color filter units:
forming a black matrix on the substrate formed with the patterns for color filter units, the black matrix being located between the patterns for color pixel units.

* * * * *